United States Patent [19]

Trabert

[11] Patent Number: 4,597,603
[45] Date of Patent: Jul. 1, 1986

[54] MOUNTING ARRANGEMENT OF A MOTOR VEHICLE FRONT-END COMPONENT MADE OF PLASTICS

[75] Inventor: Hans-Gerhard Trabert, Russelsheim, Fed. Rep. of Germany

[73] Assignee: General Motors Corporation, Detroit, Mich.

[21] Appl. No.: 730,817

[22] Filed: May 6, 1985

[30] Foreign Application Priority Data

May 10, 1984 [DE] Fed. Rep. of Germany ....... 3417337

[51] Int. Cl.⁴ ............................................. B62D 27/06
[52] U.S. Cl. .................... 296/194; 296/31 P; 296/197; 403/4; 403/408.1
[58] Field of Search .................. 296/194, 31 P, 197; 403/4, 408.1

[56] References Cited

U.S. PATENT DOCUMENTS

| | | | |
|---|---|---|---|
| 3,295,627 | 1/1967 | Fleck et al. | 296/194 |
| 3,744,835 | 7/1973 | Carbone et al. | 296/194 |
| 3,850,474 | 11/1974 | Welch | 296/31 P |

FOREIGN PATENT DOCUMENTS 3247989 6/1984 Fed. Rep. of Germany .

*Primary Examiner*—Robert R. Song
*Attorney, Agent, or Firm*—William A. Schuetz

[57] ABSTRACT

The invention proposes an arrangement of a motor vehicle front-end unit made of a plastics material on the vehicle body. The front-end unit is comprised of a bumper having a radiator grille integrally formed thereon and is force-lockingly retained on a body support frame at, at least, two lower and three upper mounting points in the region of the longitudinal body support member, and an upper cross member interconnecting the wheel wells in holes and oblong apertures, respectively. In order to provide for an adjustable, solid and reliable mounting of the front-end unit on the vehicle body, the mounting flange of the radiator grille is provided with apertures of relatively large horizontal length which are cooperating with downwardly slanted oblong apertures arranged in the cross member so as to form an acute angle with the plane of the surface on which the vehicle is standing, and the front-end unit is adjustably fixed into position by means of fastening means which are force-lockingly extending through respective cooperating pairs of apertures.

6 Claims, 3 Drawing Figures

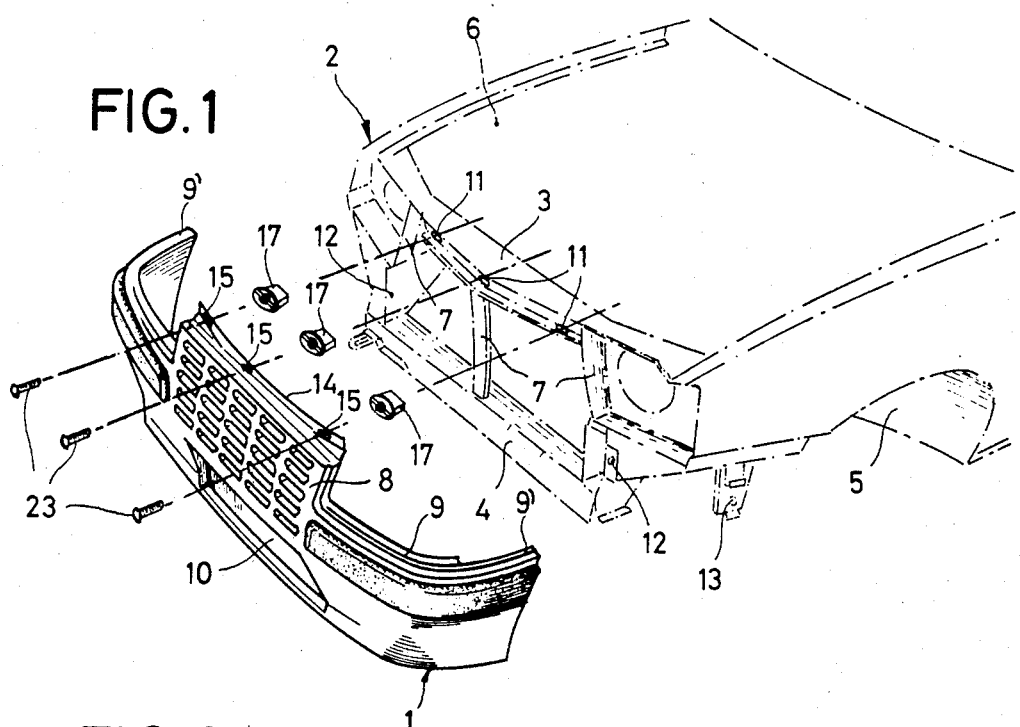
FIG. 1
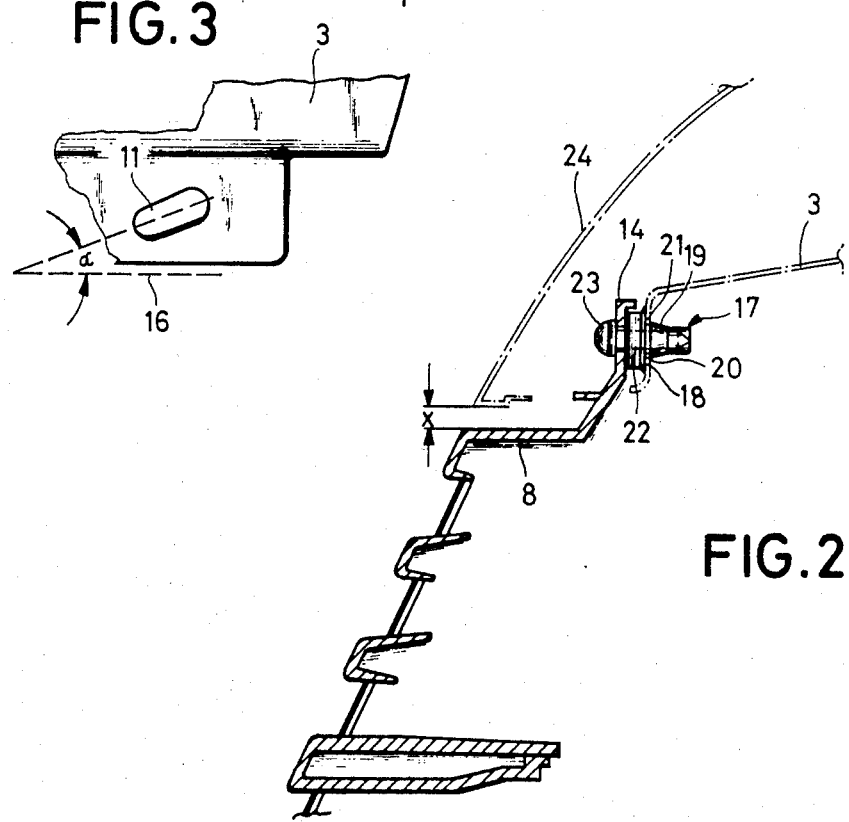
FIG. 3
FIG. 2

MOUNTING ARRANGEMENT OF A MOTOR VEHICLE FRONT-END COMPONENT MADE OF PLASTICS

The invention relates to a mounting arrangement of a motor vehicle front-end component made of plastics on the vehicle body, said front-end component being in the form of a unitary integrally formed bumper-grille combination and being force-lockingly retained on a vehicle support frame in holes and oblong mounting apertures at, at least, two lower and three upper mounting points disposed, respectively, in the region of the longitudinal body support members and an upper cross member interconnecting the wheel wells.

Typically, a one-piece vehicle front-end component of this type, which may be made of a polymer material, and which may include metallic reinforcement or backing members, is fixed to the body support frame through threaded connectors. The front-end unit should be adapted to permit horizontal and vertical adjustment during installation to compensate for manufacturing tolerances. Adjustability will enable the front-end component to be spaced at equally large and parallel distances from the adjacent body components, such as the engine hood and the lateral vehicle lamps. To accomplish the desired spacing, it has been the practice in the past to provide that the respective mounting holes in the upper portion of the front-end component, i.e., the portion that forms the radiator grille, and the corresponding mounting holes in the cross member of the body, be in the form of oblong apertures and be arranged in such a manner that they overlap one another in a crosswise relationship and that the other mounting holes be over-dimensioned. This arrangement will provide that the front-end component is displaceable in the direction of a pair of vertically superposed axes of a vehicle plane for the purpose of adjusting the front-end component prior to tightening the threaded mounting bolts which are extending through the mounting holes and, if desired, through radially expanding wedging members disposed in the mounting holes.

The disadvantage of such an arrangement is that if the retaining forces are insufficient, vibrations incidental to normal vehicle operation may cause loosening of the fasteners in the mounting holes, and that as a result the front-end component may drop in the vertically extending oblong mounting apertures. Downward displacement of the front-end component may also be caused if a force is imposed thereon while the engine hood is open, as may happen, inadvertently, if the mechanic is supporting some of his weight on the front-end component.

It is the object of the present invention to eliminate the aforementioned disadvantages and to provide a mounting arrangement for a motor vehicle front-end component of the type described in the foregoing in which, while enabling adjustability during installation, the connection between the front-end component and the vehicle body is vey solid and reliable.

In pursuance of this objective, the holes provided in the mounting flange of the radiator grille are in the form of relatively long horizontally extending apertures which cooperate with oblong apertures in the body cross member extending at an acute angle to the horizontal plane of the vehicle, with fastening means being provided for enabling relative adjustment which are force-lockingly extending through the cooperating pairs of apertures.

While retaining the ability to adjust the front-end component in all directions relative to a vehicle plane as the front-end component is mounted onto the vehicle body, the arrangement described in the foregoing provides that the front-end component is positively retained in its mounting position since it is supported on an inclined plane. Consequently, only relatively small retaining forces are needed for fixing the front-end component in its position, and the possibility of displacing the front-end component from its original mounting position during vehicle operation is, for all practical purposes, nonexistent.

In accordance with one preferred embodiment of the invention, the longitudinal axes of the oblong apertures are forming an acute angle of between 20° and 40° with the horizontal plane of the vehicle. Experience has been that an angle of 22° is sufficient for adjusting the spacing between the front-end component and the adjacent laterally disposed headlights or the engine hood.

In a preferred form of the invention, the fastening means are expansible plug-like spacers with a central bore. The plugs of the spacers engage in oblong apertures, and each plug is force-lockingly retained on the wall of the oblong aperture by means of a threaded bolt which is extending through an oblong aperture of relatively great horizontal length and which is adapted to be threaded into the bore of the plug.

Preferably, each spacer is comprised of an expansible plug having a disk-like flange formed thereon. A groove, which is defined by abutment shoulders, is disposed on the spacer between the plug and the flange and is adapted for engagement with the oblong aperture. As long as the threaded bolt is not tightened, the spacer can be snapped into the oblong aperture by way of its annular groove and is adapted for displacement in the aperture. Furthermore, the spacer is adapted, by way of the retaining shoulders which engage the body panel from behind, to be aligned in a direction that is opposite of the direction of extension. This arrangement will, as long as the threaded bolts are not tightened, enable the spacers in the oblong apertures of the cross member and, by virtue of the fastening bolts extending through the apertures of the radiator grille, the entire front-end member to be displaced in all directions of a vehicle plane and to be spaced at equal distances from the adjcent body members. Naturally, this will require that the other mounting apertures between the front-end component and the body support members be suitably dimensioned to allow for the adjustment movements of the front-end component in the corresponding pair of overlapping apertures.

It should be appreciated that a variety of arrangements may be utilized in the practice of this invention. One exemplary embodiment is illustrated in the drawings and will be described in the following.

In the drawings,

FIG. 1 shows a motor vehicle front-end component in a perspective exploded view to a front-end of a motor vehicle body, FIG. 2 is a longitudinal section of the front-end component after attachment to the vehicle body and FIG. 3 is a view on an enlarged scale of a mounting location for the front-end component in the cross member according to the cutout A in FIG. 1.

Numeral 1 designates a motor vehicle front-end component which is adapted for attachment to a schematically illustated front-end portion 2 of a vehicle body. The front-end portion 2 includes an upper cross member 3 and a lower cross member 4. These cross members are interconnected to wheel wells 5, 6 and are vertically connected to one another by a support member 7.

The front-end component 1 is a one-piece molded plastic part which is made of a polymer material with an elastomer filler, and is fabricated in accordance with suitable molding techniques known in the art. The front-end component is self-supporting, but in certain instances, depending on vehicle type and size, it may be provided on the side facing the body with metallic inserts or reinforcing members which may serve as means by which the front-end member is attached to the body support members. The front-end component includes a radiator grille 8 provided with air passage openings, a bumper 9 with lateral ends 9' which curve around the vehicle body, as well as a front spoiler 10.

The front-end component 1 is mounted, by means of suitable mounting elements, to the body, i.e., the support members thereof, in the upper region at three mounting locations which are in the form of oblong apertures 11 in the upper cross member 3, furthermore at three mounting locations 12 in the intermediate region at the ends of the longitudinal members of the vehicle body, and finally at two additional mounting locations 13 in the lower region of the laterally bent bumper ends. The mounting procedures in the intermediate and lower region of the front-end component 1 are conventional and are not part of the invention, i.e., in these regions the front-end component may be attached directly to suitable members of the body support frame structure by way of threaded or snap-on fasteners, or by way of metallic reinforcing members that are snapped onto the front-end component and which in turn are being fastened to the body support frame through suitable conventional mounting means.

The mounting flange 14 of the radiator grille 8 has three oblong apertures 15 which extend horizontally of and parallel with the plane 16 on which the vehicle stands and which are cooperating with respective oblong apertures 11 in the cross member 3. The oblong apertures 11, unlike the apertures 15, are arranged in the cross member 3 so as to form an acute angle alpha of 22° with the plane 16. Spacers 17, which are in the form of plastic expansible dowel-like elements, are provided and are adapted for snap-on engagement with the oblong apertures 11 in a manner so as to be displaceable therein. For this purpose, each spacer 17 is provided, adjacent to a disk-like flange 18 covering the width of the oblong aperture, with a slotted, expansible plug 19 of rectangular or square cross section and having a guide groove 21 which is defined by a pair of abutment shoulders 20 arranged opposite to one another, as well as a central through bore 22. When the front-end component 1 is installed, three threaded fastening bolts 23 are inserted into the oblong apertures 15 of the radiator grille 8 and are threaded into the bores 22 of the spacers 17 that had previously been inserted by snap-on engagement into the cross member 3. Subsequently, the other fastening means mentioned earlier (not illustrated in the drawings) are being connected to the support means 12 and 13. Prior to tightening the threaded bolts 23 and the other fastening elements, the front-end unit 1 can, through horizontal displacement relative to the position of the threaded bolts 23 by means of its oblong apertures, as well as through displacement in elevation by means of the spacers 17 which are adapted for sliding movement on the tilted plane of the oblong apertures 11, be moved in all directions of a vehicle plane, provided, of course, that suitable means are provided in the other support means 12, 13 so as to permit such adjusting movement of the entire front-end unit 1. The adjusting movement of the front-end unit 1 enables one to establish equal distances to the adjacent headlights as well as a parallel distance x of the upper edge of radiator grille 8, which is visible when looking at the front of the vehicle, relative to the front edge of the engine hood 24 indicated in FIG. 2 by the dash-dotted lines, so that the appearance of the front-end of the vehicle is enhanced. After completion of the adjusting operations, the threaded bolts 23 as well as all other fastening elements are tightened, so that the front-end unit 1 will be securely retained in its installed position during normal use and under normal operating conditions.

The embodiments of the invention in which an exclusive property or privilege is claimed are defined as follows:

1. Arrangement of a motor vehicle front section made of synthetic material on the vehicle body, which front section consists of a bumper with an integrally molded radiator grille and is retained by interference fit in holes and slots on a frame of the body at least at two lower and three upper mounting points in the region of the longitudinal members of the body and an upper cross member connecting the wheel cases, characterized by the fact that in a mounting flange 14 of the radiator grille 8 are disposed holes 15 of large horizontal dimensions which correspond to slots 11 disposed obliquely in the cross member 3 at an acute angle (alpha) to the level 16 of the vehicle, wherein fastening means which pass through the corresponding pairs of holes respectively by interference fit are provided for mutual fixing with adjustable position.

2. Arrangement according to claim 1, characterized by the fact that the major axis of the slots 11 form with the level 16 of the vehicle in each case an acute angle (alpha) within a range from about 20 degrees to 40 degrees.

3. Arrangement according to claim 2, characterized by the fact that the acute angle (alpha) which the major axes of the slots form respectively with the level 16 amounts to 22 degrees.

4. Arrangement according to claim 2, characterized by the fact that there are provided as the fastening means straddling dowel-like distance pieces 17 with central bore 22, the dowels 19 of which engage in the slots 11 and can be fixed to the slot wall by interference fit in each case by a fastening screw 23 which can be screwed into the dowel bore 22, passing through a hole 15 of large horizontal dimensions in the mounting flange 14 of the radiator grille 8.

5. Arrangement according to claim 4, characterized by the fact that each distance piece 17 consists of a straddling dowel 19 with integrally molded washer-like flange 18, and between the two parts is disposed a guide groove 21 defined by locking shoulders 20, for engaging in the slot 11.

6. Arrangement according to claim 5, characterized by the fact that the distance piece 17 can, with the fastening screw 23 released, be clipped into the slot 11 by its guide groove 21 and displaced in the slot and is directed by the locking shoulders 20 engaging behind the body panel in a direction opposite that of the major axis.

* * * * *